(12) United States Patent
Okutani et al.

(10) Patent No.: US 11,345,395 B2
(45) Date of Patent: *May 31, 2022

(54) STEERING DEVICE

(71) Applicant: Isuzu Motors Limited, Tokyo (JP)

(72) Inventors: Junpei Okutani, Fujisawa (JP);
Haruyuki Hosoya, Yokohama (JP);
Kousuke Kawakami, Yokohama (JP)

(73) Assignee: Isuzu Motors Limited, Tokyo (JP)

( * ) Notice: Subject to any disclaimer, the term of this patent is extended or adjusted under 35 U.S.C. 154(b) by 142 days.

This patent is subject to a terminal disclaimer.

(21) Appl. No.: 16/642,909

(22) PCT Filed: Aug. 2, 2018

(86) PCT No.: PCT/JP2018/029061
§ 371 (c)(1),
(2) Date: Feb. 28, 2020

(87) PCT Pub. No.: WO2019/044360
PCT Pub. Date: Mar. 7, 2019

(65) Prior Publication Data
US 2020/0346683 A1     Nov. 5, 2020

(30) Foreign Application Priority Data

Aug. 30, 2017  (JP) .............................. JP2017-165757

(51) Int. Cl.
*B62D 5/04* (2006.01)
*B62D 1/189* (2006.01)
*B62D 5/22* (2006.01)

(52) U.S. Cl.
CPC ........... *B62D 5/0403* (2013.01); *B62D 1/189* (2013.01); *B62D 5/0415* (2013.01); *B62D 5/22* (2013.01)

(58) Field of Classification Search
CPC .... B62D 5/0403; B62D 5/0415; B62D 1/189; B62D 5/22
(Continued)

(56) References Cited

U.S. PATENT DOCUMENTS 4,351,554 A * 9/1982 Miller .................. B62D 33/067
180/89.14
4,733,575 A * 3/1988 Nakamura ............. B62D 1/195
280/775

(Continued)

FOREIGN PATENT DOCUMENTS

CN       1745013       3/2006
CN     101945797      1/2011
(Continued)

OTHER PUBLICATIONS

International Search Report and the Written Opinion dated Sep. 25, 2018 From the International Searching Authority Re. Application No. PCT/JP2018/029061 and Its Translation of Search Report Into English. (9 Pages).

*Primary Examiner* — Tony H Winner (57) ABSTRACT

A steering device (1) installed in a vehicle is equipped with: a steering wheel (10); a steering shaft (20) having a first shaft part (21), one end of which is directly connected to the steering wheel (10), and a second shaft part (22) connected to the first shaft part (21) on the other end side thereof; a coaxial motor (50) which applies a rotational force to the first shaft part (21), and has a motor housing (51) which supports the steering shaft (20) and surrounds the periphery of the first shaft part (21); and a motor securing unit (70) which, in order to determine the support position of the steering wheel (10), secures the motor housing (51) and a support bracket (60) secured inside the vehicle compartment.

7 Claims, 11 Drawing Sheets

(58) Field of Classification Search
USPC ........................................ 180/406, 407, 432
See application file for complete search history.

(56) References Cited

U.S. PATENT DOCUMENTS

| | | | | |
|---|---|---|---|---|
| 7,581,466 | B2 * | 9/2009 | Yoshioka | B62D 1/192 |
| | | | | 280/775 |
| 9,097,612 | B2 * | 8/2015 | Kulawiec | G01M 11/005 |
| 2006/0127195 | A1 | 6/2006 | Hosoe et al. | |
| 2006/0162989 | A1 | 7/2006 | Yamada | |
| 2006/0219469 | A1 * | 10/2006 | Okada | B62K 5/08 |
| | | | | 180/443 |
| 2006/0226719 | A1 | 10/2006 | Nakanishi et al. | |
| 2007/0277636 | A1 * | 12/2007 | Higashi | B62D 5/0415 |
| | | | | 74/388 PS |
| 2010/0147618 | A1 * | 6/2010 | Osonoi | B62D 5/003 |
| | | | | 180/403 |
| 2011/0000737 | A1 | 1/2011 | Nagase et al. | |
| 2016/0304113 | A1 * | 10/2016 | McCurdy | B62D 1/183 |
| 2018/0229754 | A1 * | 8/2018 | Kurokawa | B62D 1/184 |

FOREIGN PATENT DOCUMENTS

| | | | |
|---|---|---|---|
| JP | 61-017373 | | 1/1986 |
| JP | 2006-103642 | | 4/2006 |
| JP | 2006/103642 A | * | 4/2006 |
| JP | 2006-264622 | | 10/2006 |
| JP | 2013-010380 | | 1/2013 |
| JP | 2015-116898 | | 6/2015 |
| JP | 2016-060338 | | 4/2016 |
| WO | WO2012/060744 A1 | * | 10/2012 ............ B62D 1/189 |
| WO | WO 2019/044360 | | 3/2019 |

* cited by examiner

STEERING DEVICE

TECHNICAL FIELD

The present disclosure relates to a steering device.

BACKGROUND ART

It is known that, regarding steering devices of a vehicle, some of the steering devices are provided with an electric motor that assists a driver in steering are known.

Patent Literature (hereinafter, referred to as "PTL") 1 discloses a configuration of a steering device of this type in which the electric motor is disposed integrally with a rack and pinion mechanism and the like on the steered wheel side.

CITATION LIST

Patent Literature PTL 1

Japanese Patent Application Laid-Open No. 2016-060338

SUMMARY OF INVENTION

Technical Problem

Meanwhile, studies have recently been conducted to dispose the electric motor in a vehicle cabin, and to use it as an alternative to a driver's steering operation (for example, travel position correction within a travel lane, automatic parking, automatic driving, or the like). Such an electric motor is considered to have a configuration, for example, in which a steering force that substitutes for the driver's steering operation is applied to an installed power steering unit so that the vehicle can be steered even when there is no driver's steering operation.

However, when the electric motor is disposed in the vehicle cabin, a layout problem related, e.g., to storage space tends to arise. In particular, for a vehicle (for example, a truck, a tractor, or the like) with a tiltable vehicle cabin (or cab/cabin), it is necessary to employ a device configuration made from a viewpoint different from that of the existing steering devices (e.g., the prior art in PTL 1) since such a vehicle with a tiltable vehicle cabin requires a configuration for enabling cab tilting (tilting of the vehicle cabin).

The present disclosure has been made in view of the above-mentioned problem, and an object of the present disclosure is to provide a steering device which makes it possible to solve the layout problem expected when an electric motor is disposed in a vehicle cabin.

Solution to Problem

The main present disclosure for solving the above-mentioned problem is a steering device to be mounted on a vehicle, the steering device including: a steering wheel disposed in a vehicle cabin; a steering shaft including a first shaft portion directly connected at one end to the steering wheel, and a second shaft portion to be connected to an other-end side of the first shaft portion; a coaxial motor including a motor housing that surrounds a periphery of the first shaft portion to support the steering shaft, the coaxial motor causing rotational power to act on the first shaft portion; and a motor fixing part that fixes the motor housing and a support bracket fixed in the vehicle cabin, so as to determine a position at which the steering wheel is supported.

Advantageous Effects of Invention

According to the present disclosure, it is possible to realize a steering device that solves a layout problem expected when an electric motor is disposed in a vehicle cabin.

DESCRIPTION OF EMBODIMENT

Hereinafter, preferred embodiments of the present disclosure will be described in detail with reference to the appended drawings. In addition, in the present specification and drawings, components having substantially the same functional structure are provided with the same reference symbols, and redundant description will be omitted.

[Entire Configuration of Steering Device]

Hereinafter, the entire configuration of the steering device according to one embodiment will be described with reference to FIGS. 1 and 2.

In the below-mentioned figures, a common orthogonal coordinate system (X, Y, Z) is shown in order to clarify the positional relationship between the components. The positive direction of the Z axis corresponds to the upper side of the vehicle, the positive direction of the X axis corresponds to the front side of the vehicle, and the positive direction of the Y axis corresponds to the left side in the cross vehicle direction.

Figure 1:
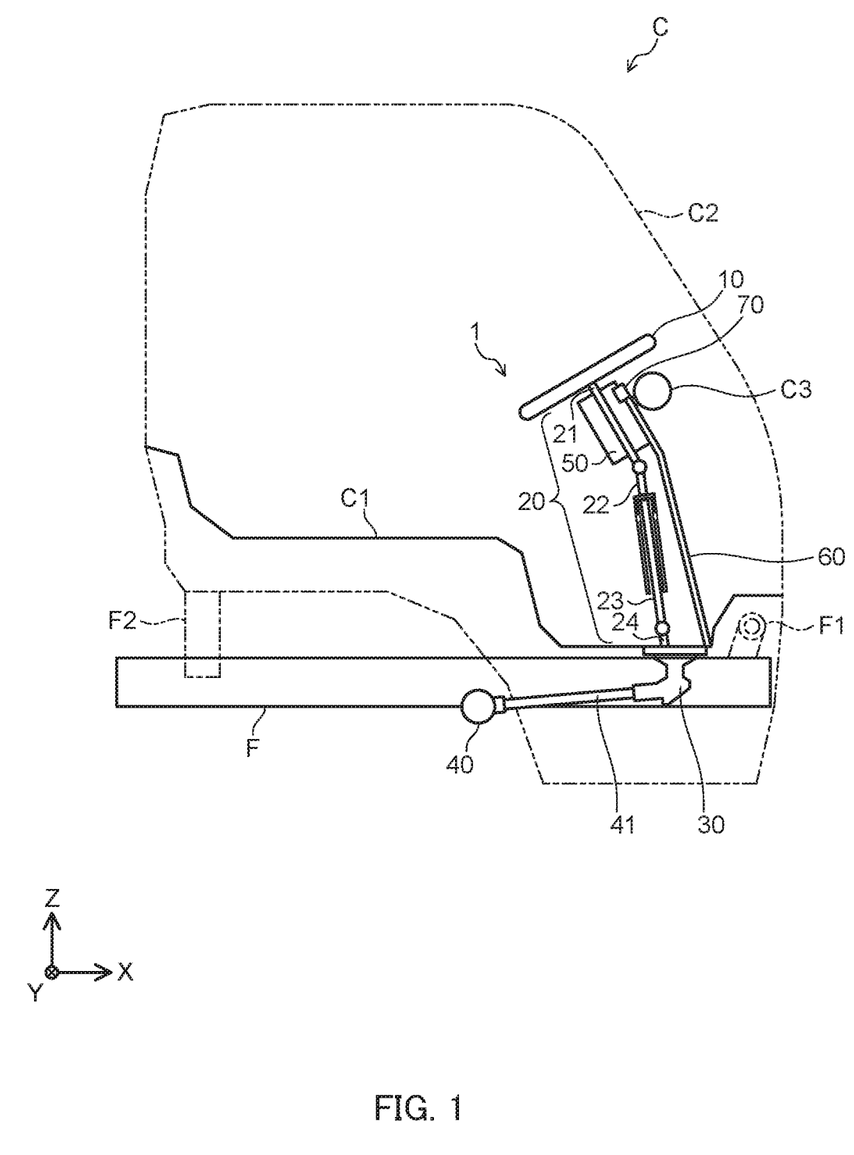
FIG. 1 illustrates one example of an entire configuration of a steering device according to one embodiment.

FIG. 1 schematically illustrates one example of the entire configuration of the steering device according to the present embodiment.

Steering device 1 according to the present embodiment is mounted on a cab-over vehicle.

To begin with, the vehicle according to the present embodiment will be outlined. The cab-over vehicle includes cab C and chassis frame F. Chassis frame F is a chassis that extends in the front-rear direction, and is disposed on both the left and right sides and supports entire cab C from below. Chassis frame F includes tilt shaft F1 that pivotally supports the front end portion of cab C such that cab C is rotatable, and cab mount F2 that supports the rear end portion of cab C such that cab C is detachable.

Cab C includes floor panel C1 on the bottom surface side, dash panel C2 on the front surface side, and side panels (not illustrated) on the side surface sides. Cab C forms a vehicle cabin space with these panels. Further, cab C includes, on the inside of dash panel C2, reinforcement C3 (bar-shaped reinforcing material) that extends along the cross vehicle direction, with one end and the other end being fixed to the side panels on both sides.

In the normal state of cab C (which represents a state where the cab tilting is not carried out; the same applies hereinafter), the front end portion of cab C is supported by tilt shaft F1 and the rear end portion of cab C is supported by cab mount F2. During the cab tilting, the rear end side of cab C turns upward about tilt shaft F1, so that cab C is set to a tilt position.

Next, a description will be given of steering device 1 mounted on such a cab-over vehicle.

Steering device 1 according to the present embodiment includes steering wheel 10, steering shaft 20, bevel gear device 30, steering gearbox 40, coaxial motor 50, support bracket 60, motor fixing part 70, and the like.

In steering device 1 according to the present embodiment, the rotational power of a rotational operation performed by the driver on steering wheel 10 is transmitted to steering shaft 20, bevel gear device 30, and steering gearbox 40 in this order. In steering device 1 according to the present embodiment, coaxial motor 50 also causes the rotational power to act on steering shaft 20 as an operation assisting force or as an operation during automatic driving.

Steering wheel 10 is a steering member that the driver rotates when steering the vehicle. Steering shaft 20 is connected to steering wheel 10.

Steering shaft 20 transmits, to steering gearbox 40 via bevel gear device 30, the rotational motion given to steering wheel 10. Steering shaft 20 has a configuration in which a plurality of shafts 21 to 24 are connected to one another via a universal joint or the like.

Specifically, steering shaft 20 according to the present embodiment includes, in the order from the side of steering wheel 10, wheel direct connection shaft 21 directly connected to steering wheel 10 (corresponding to the "first shaft portion" of the present invention), first intermediate shaft 22 (corresponding to the "second shaft portion" of the present invention) connected to wheel direct connection shaft 21 via the universal joint, and second intermediate shaft 23 connected to first intermediate shaft 22 so as to be linearly telescopic by spline fitting, and third intermediate shaft 24 connected to second intermediate shaft 23 via the universal joint. Third intermediate shaft 24 is inserted through an opening penetrating floor panel C1 of cab C and below cab C, and is connected to bevel gear device 30.

Wheel direct connection shaft 21 is disposed to extend through a motor housing of coaxial motor 50 fixed to wheel direct connection shaft 21 on the side of cab C, and is supported by the motor housing. That is, shafts 21 to 24 of steering shaft 20 and steering wheel 10 are supported at predetermined positions in cab C by the motor housing of coaxial motor 50 (details will be described later).

Note that steering shaft 20 according to the present embodiment inclines forward about the universal joint between second intermediate shaft 23 and third intermediate shaft 24 during cab tilting. At this time, the total length of steering shaft 20 can increase or decrease because of extension/retraction of a fitting region at a connection position between first intermediate shaft 22 and second intermediate shaft 23 (details will be described later).

Bevel gear device 30 is attached to chassis frame F below cab C and serves as a relay between steering shaft 20 and steering gearbox 40. Bevel gear device 30 transmits, to pinion shaft 41 of steering gearbox 40, the rotational power transmitted from third intermediate shaft 24.

Steering gearbox 40 is attached to chassis frame F below cab C, and is interlocked with steering shaft 20 to allow steered wheels (not illustrated) to be steered on the occasion of the rotation of steering shaft 20. In steering gearbox 40, a rack and pinion mechanism is used, for example, and steering gearbox 40 converts the rotational power transmitted to pinion shaft 41 into a straight motion in the cross vehicle direction by a rack that meshes with a pinion of pinion shaft 41, so as to allow the steered wheels to be steered.

Steering gearbox 40 according to the present embodiment has a hydraulic power assist mechanism in order to further enhance a steering assisting force of coaxial motor 50 described later. The hydraulic power assist mechanism performs steering assistance, for example, by changing the open state of a hydraulic control valve according to the rotational motion of pinion shaft 41, so as to boost, using an operating oil, the steering force that urges the rack.

Support bracket 60 is fixed in cab C, and supports coaxial motor 50 and steering shaft 20 via motor fixing part 70.

Motor fixing part 70 fixes support bracket 60 and the motor housing of coaxial motor 50 so as to fix a position at which steering wheel 10 is supported. In addition, motor fixing part 70 according to the present embodiment fixes the relative position (meaning the relative positional relationship; the same applies hereinafter) between support bracket 60 and the motor housing of coaxial motor 50 in a state where the relative position is adjustable (details will be described later with reference to FIG. 5 and the like).

Coaxial motor 50 is an electric motor that generates the rotational power in a rotor and applies the rotational power to wheel direct connection shaft 21 of steering shaft 20. Coaxial motor 50 according to the present embodiment is arranged to surround wheel direct connection shaft 21 such that the central axis of a rotating magnetic field generated by a stator (rotational axis of the rotor) and the rotational axis of wheel direct connection shaft 21 are coaxial.

Figure 2:
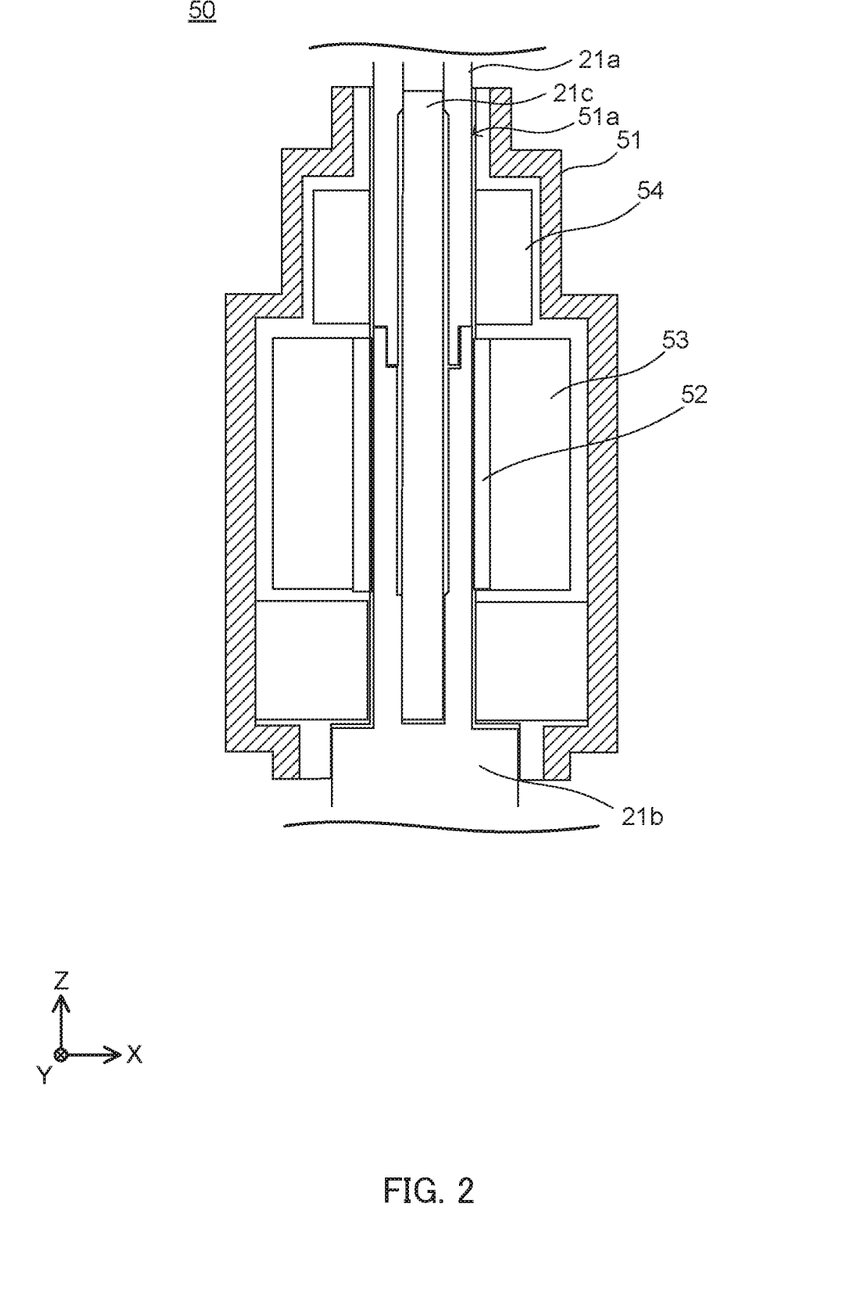
FIG. 2 illustrates one example of a configuration of a coaxial motor according to one embodiment.

FIG. 2 illustrates one example of a configuration of coaxial motor 50 according to the present embodiment.

Coaxial motor 50 includes motor housing 51, rotor 52, stator 53, torque sensor 54, and a motor ECU (not illustrated).

Motor housing 51 houses rotor 52, stator 53, and torque sensor 54. Motor housing 51 has hollow portion 51a that forms a through hole, and surrounds wheel direct connection shaft 21 with the inner peripheral surface of hollow portion 51a such that wheel direct connection shaft 21 is rotatable. Wheel direct connection shaft 21 is inserted through hollow portion 51a of motor housing 51.

In addition, wheel direct connection shaft 21 according to the present embodiment includes upper shaft member 21a and lower shaft member 21b, and these shaft members are connected via torsion bar 21c in hollow portion 51a.

Stator 53 is disposed in motor housing 51 such that the central axis of the rotating magnetic field generated by stator 53 is coaxial with the rotational axis of wheel direct connection shaft 21. Rotor 52 is disposed along hollow portion 51a of motor housing 51 such that its rotational axis is coaxial with the rotational axis of wheel direct connection shaft 21. Rotor 52 transmits its rotational power to lower shaft member 21b, for example, by a deceleration mechanism using a wave gear device.

As for the motor ECU, torque sensor 54 detects steering torque of the rotational operation of the driver from a rotational angle difference between upper shaft member 21a and lower shaft member 21b connected by torsion bar 21c, and the motor ECU causes a motor driving current according to the torque to flow through stator 53.

Coaxial motor 50 may be variously modified as long as it causes the rotational power to act on wheel direct connection shaft 21. For example, coaxial motor 50 may transmit the rotational power of rotor 52 to steering shaft 20 without using the deceleration mechanism. Coaxial motor 50 may also apply the rotating magnetic field to steering shaft 20 itself without rotor 52 interposed. Wheel direct connection shaft 21 inserted through coaxial motor 50 may also be composed of a single shaft member.

[Layout Design of Steering Device]

Here, a layout design of steering device 1 according to the present embodiment will be described with reference to FIG. 3.

Figure 3:
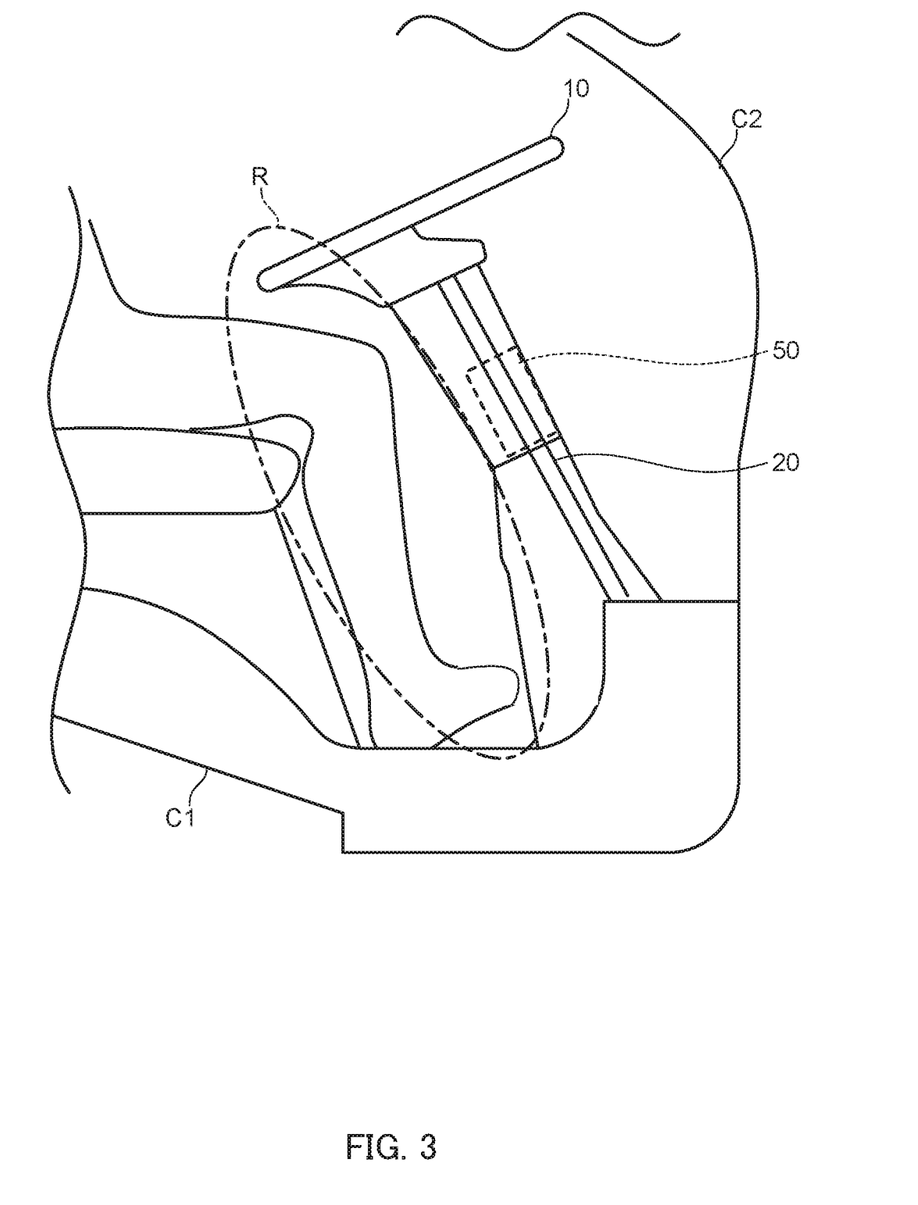
FIG. 3 schematically illustrates a layout of the steering device according to one embodiment in a vehicle cabin.

FIG. 3 schematically illustrates a layout of steering device 1 according to the present embodiment in a vehicle cabin.

Region R indicated by a dashed dotted line in FIG. 3 represents a space (hereinafter, referred to as "leg space R") in which the driver puts the driver's legs when operating a brake pedal or the like in the vehicle cabin of the cab-over vehicle. Further, dotted-line region 50 shown in FIG. 3 corresponds to a position where coaxial motor 50 according to the present embodiment is disposed.

In general, in the cab-over vehicle, it is difficult in terms of layout to dispose the electric motor below cab C, and it is desirable that the electric motor be disposed in cab C. It should be noted that disposing the electric motor in cab C is also demanded from the viewpoint of achieving substantially the same layout design regardless of the type of cab-over vehicle (for example, large, medium, or small).

However, the cab-over vehicle has a configuration in which steering shaft 20 stands upright from floor panel C1 at a substantially right angle, and it is difficult to ensure a large storage space in the front space of the vehicle cabin. Therefore, disposing the electric motor in cab C may lead to compression of leg space R.

In this regard, coaxial motor 50 is applied as the electric motor in steering device 1 according to the present embodiment as illustrated in FIG. 3. Coaxial motor 50 can be configured integrally with steering shaft 20 as described above, so that it can provide improved spaciousness and can prevent the compression of leg space R and the like.

[Support Structure for Coaxial Motor]

Next, the details of the support structure for coaxial motor 50 according to the present embodiment will be described with reference to FIGS. 4 to 9.

The inventors of the present application have thought that the use of coaxial motor 50 as the electric motor as described above can solve the problem of spaciousness, and meanwhile, also have conceived of a further problem that disposing the electric motor in cab C may lead to a shortage of the length by which steering shaft 20 is able to telescope and which is necessary for cab tilting.

To begin with, a description will be given of the length by which steering shaft 20 is able to telescope and which is necessary for cab tilting.

Figure 4:
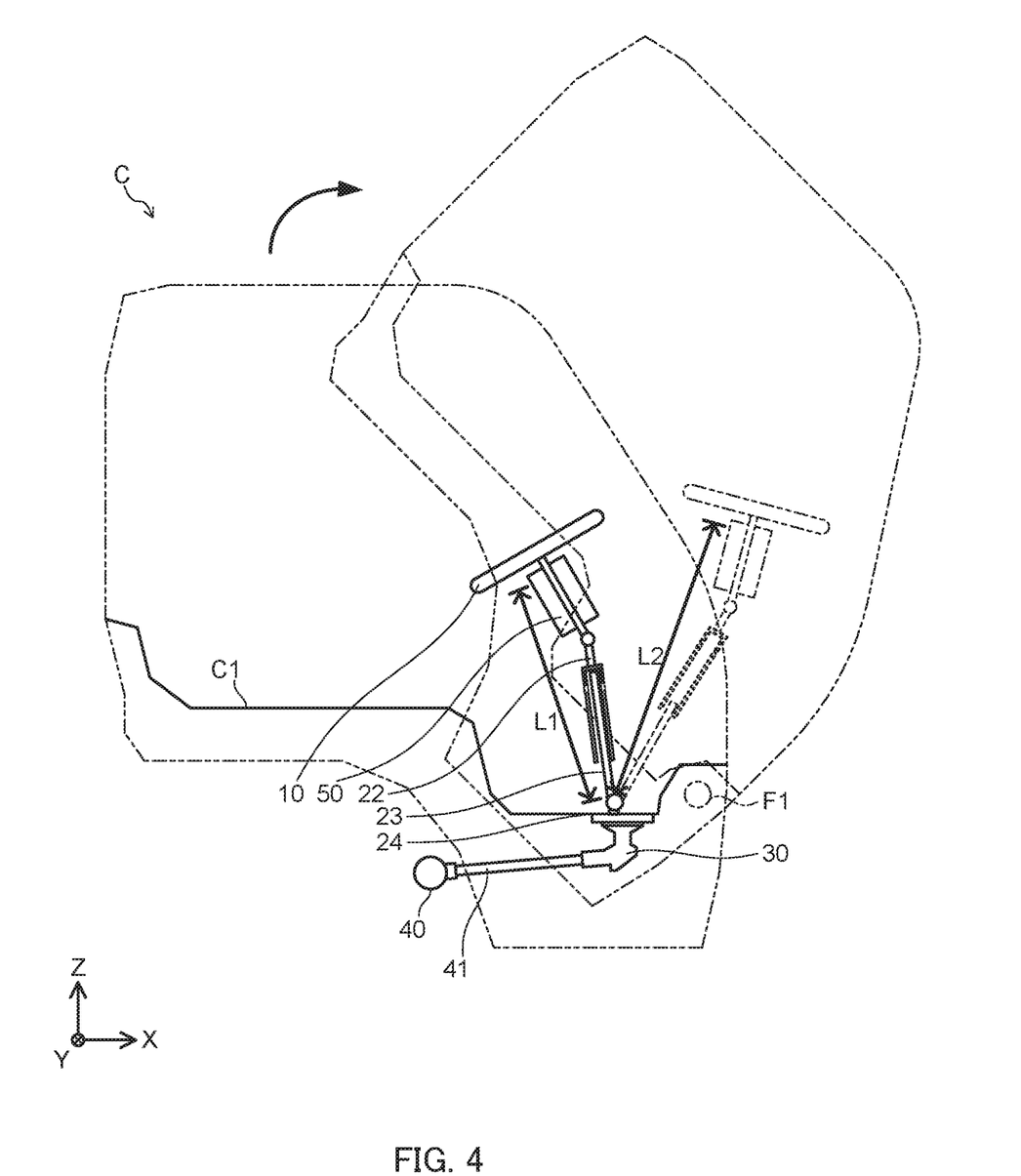
FIG. 4 is an explanatory view for explaining the length by which a steering shaft is able to telescope and which is necessary for cab tilting according to one embodiment.

FIG. 4 illustrates the state of steering shaft 20 during cab tilting.

The solid line in FIG. 4 represents the normal state, and L1 represents the total length of steering shaft 20 in the normal state. In addition, the dotted line in FIG. 4 represents the cab tilting state, and L2 represents the total length of steering shaft 20 in the cab tilting state. As illustrated in FIG. 4, during cab tilting, there is a slight gap between the position of the center about which steering shaft 20 inclines (the position of the universal joint connecting second intermediate shaft 23 to third intermediate shaft 24 in FIG. 1) and the position of tilt shaft F1. Accordingly, steering shaft 20 is extended in the axial direction in the cab tilting state, so that total length L2 of steering shaft 20 in the cab tilting state is greater than total length L1 of steering shaft 20 in the normal state.

Steering shaft 20 of the cab-over vehicle generally has a configuration in which an upper shaft (first intermediate shaft 22 in FIG. 1) on the upper side and a lower shaft (second intermediate shaft 23 in FIG. 1) on the lower side are connected telescopically to each other by spline fitting or the like. Steering shaft 20 is extended during cab tilting in the axial direction within a telescopic range of a fitting region in which the upper shaft and the lower shaft are fitted to each other, so that steering shaft 20 can be deformed from the normal state to the cab tilting state.

However, at this time, when coaxial motor 50 is disposed in the middle of steering shaft 20, the telescopic range (fitting region) at the connection position between the upper shaft and the lower shaft is shortened by the length of motor housing 51 of coaxial motor 50. Consequently, there is a risk that the upper shaft may fall off the lower shaft during cab tilting, or the tilt angle in the cab tilting state cannot be ensured sufficiently.

In view of this, the inventors of the present application have intensively studied the support structure for coaxial motor 50, and arrived at the technical idea that it is possible to ensure the length by which steering shaft 20 is able to telescope by disposing coaxial motor 50 close to the position of steering wheel 10 and causing coaxial motor 50 itself to function as a support member for steering wheel 10 and steering shaft 20.

Figure 5:
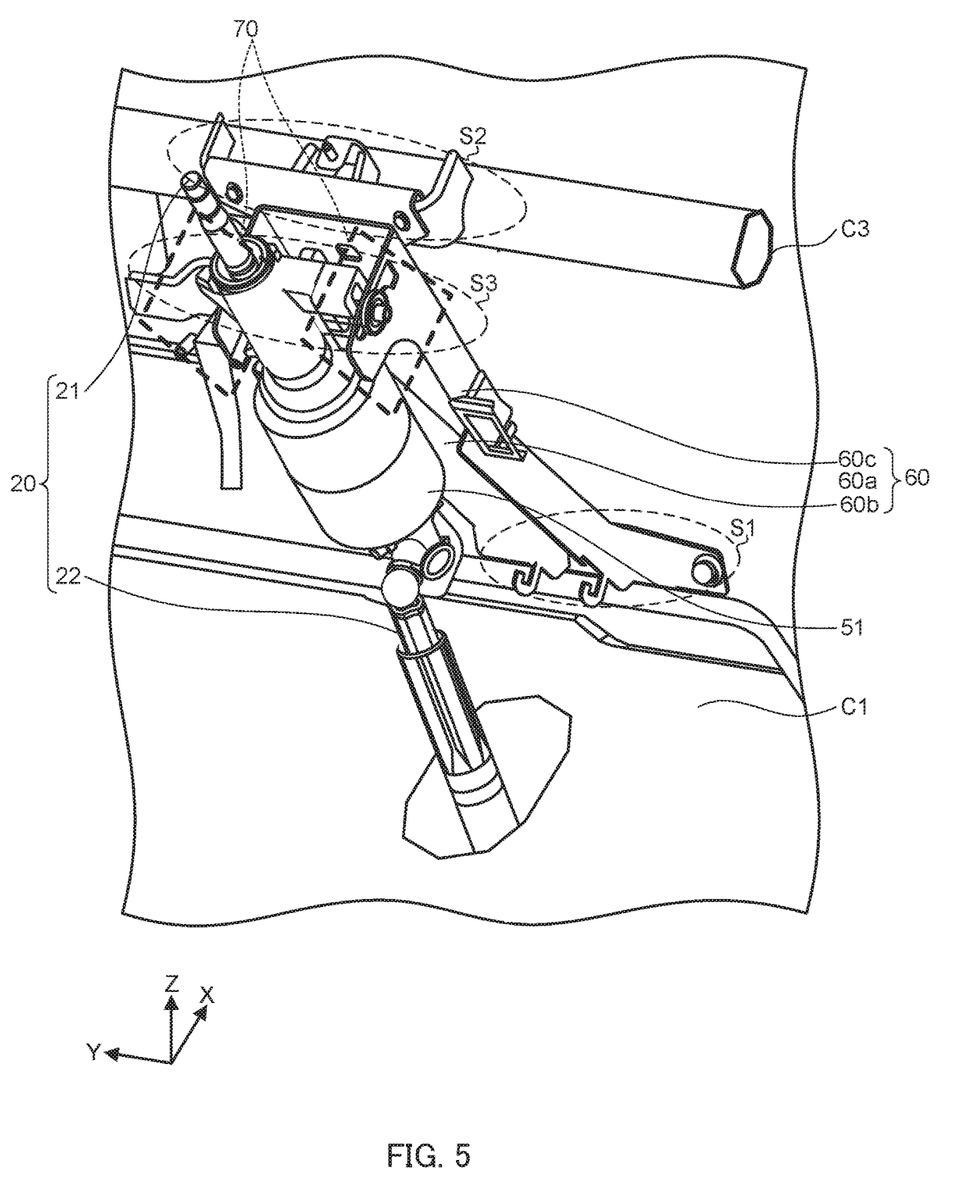
FIG. 5 is a perspective view of a support structure for the coaxial motor as seen from above according to one embodiment.
Figure 6:
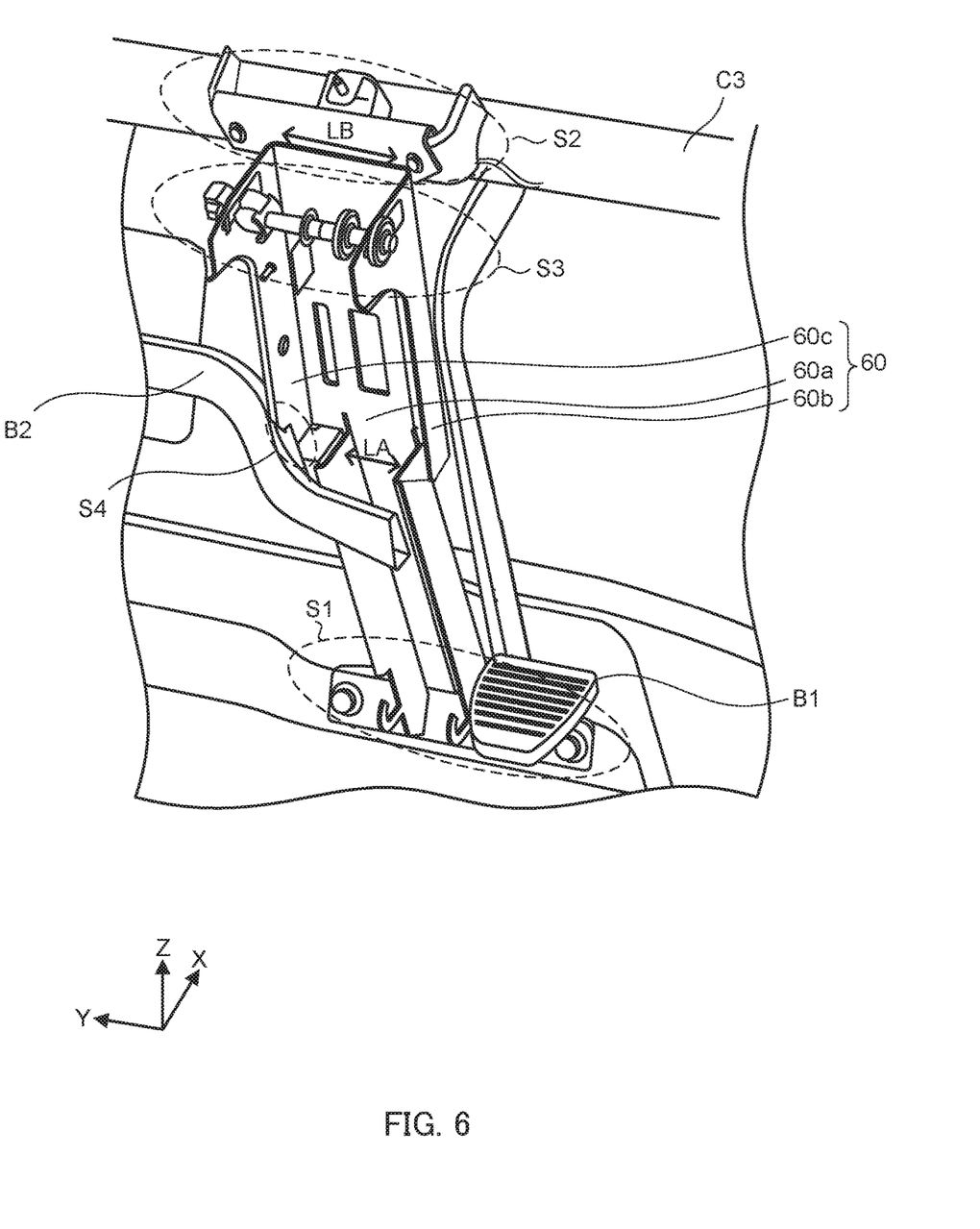
FIG. 6 is a perspective view of a support bracket as seen from above according to an embodiment.
Figure 7:
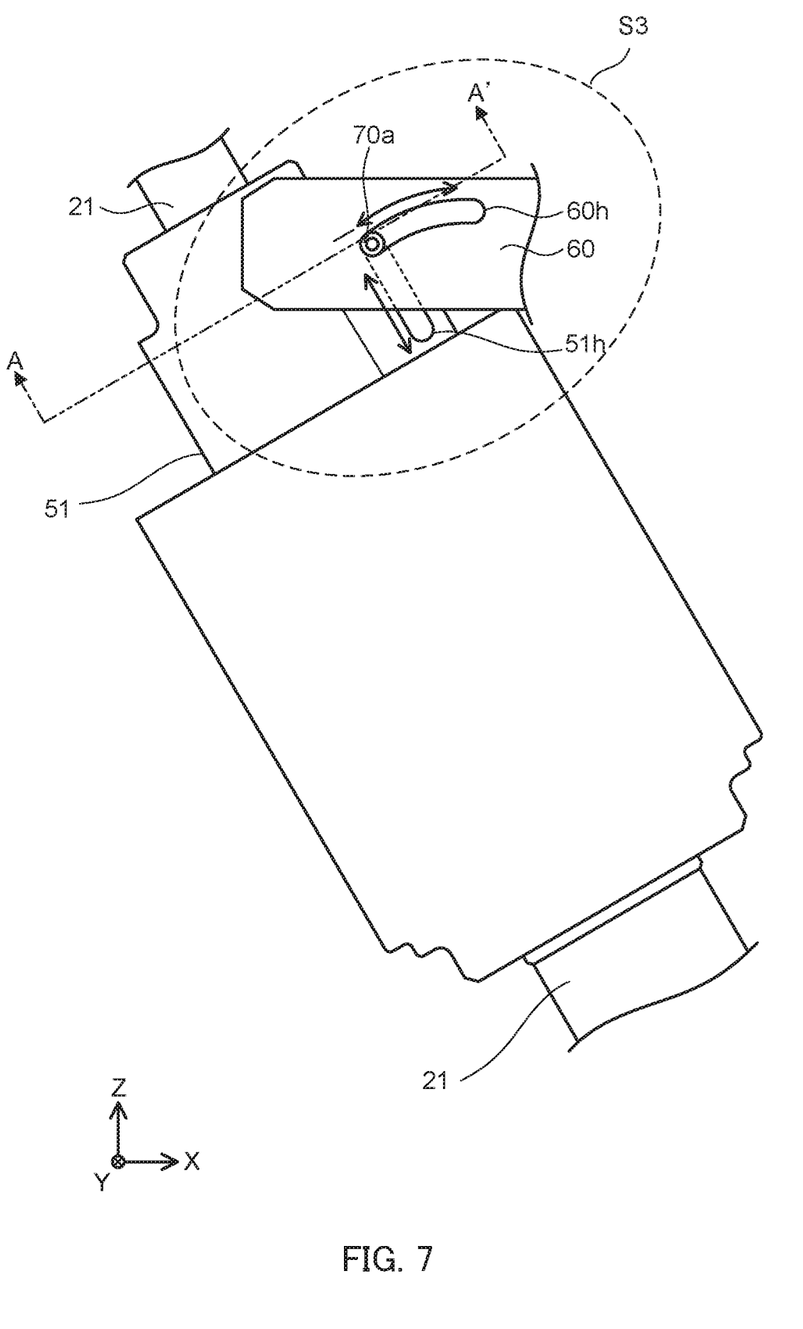
FIG. 7 is a side view of the support structure for the coaxial motor according to one embodiment.
Figure 8:
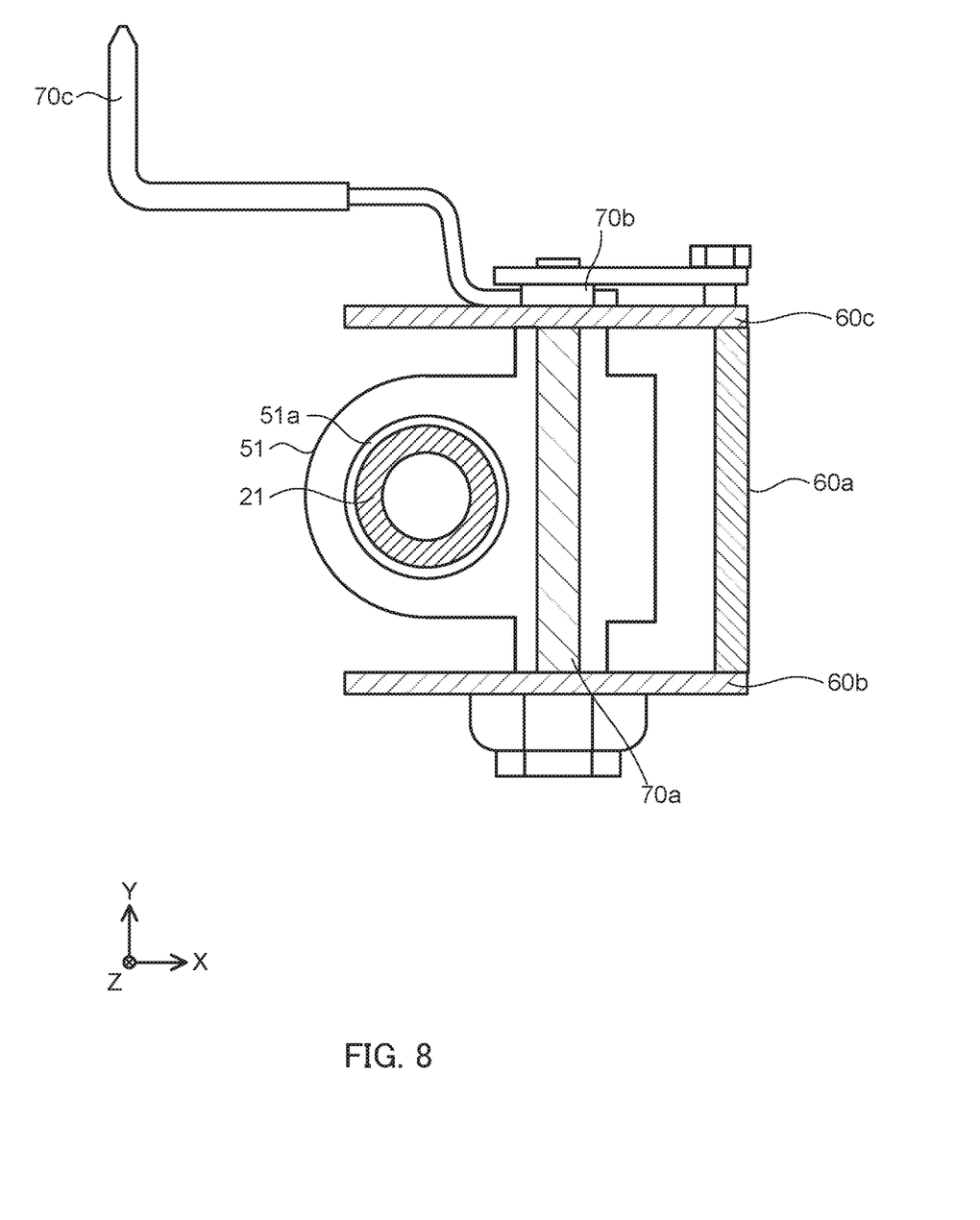
FIG. 8 is a cross-sectional view taken along dashed dotted line A-A' in FIG. 7 according to one embodiment.

FIG. 5 is a perspective view of the support structure for coaxial motor 50 as seen from above. FIG. 6 is a perspective view of support bracket 60 with coaxial motor 50 removed. FIG. 7 is a side view of the support structure for coaxial motor 50. FIG. 8 is a cross-sectional view taken along two-dot chain line A-A' in FIG. 7.

As described above, motor housing 51 has a cylindrical shape, and wheel direct connection shaft 21 is inserted through hollow portion 51a inside motor housing 51a. Motor housing 51 supports steering shaft 20 and steering wheel 10 by supporting wheel direct connection shaft 21.

Motor housing 51 is fixed, by motor fixing part 70, to support bracket 60 fixed in cab C.

Note that only column switches (for example, switches such as a blinker and the like) and a key mechanism are attached between motor housing 51 and steering wheel 10 (not illustrated).

Support bracket 60 is a shaped product of a steel material, for example. Support bracket 60 extends along the axial direction of steering shaft 20 in the front region in cab C. Support bracket 60 is fixed, at its lower-end and upper-end sides (at S1 and S2 in FIG. 5), to cab C using bolts or the like. Support bracket 60, at its upper-end side (at S3 in FIG. 5; hereinafter, this portion of support bracket 60 is also referred to as "motor holding portion S3"), holds motor housing 51 from both the left and right sides in the cross vehicle direction. The upper-end side (S2 in FIG. 5) of support bracket 60 is fixed to reinforcement C3 extending in the cross vehicle direction between both the left and right side panels of cab C.

Support bracket 60 according to the present embodiment includes a pair of side plates 60b and 60c arranged to face each other in the cross vehicle direction and extending along the axial direction of the steering shaft, and the back plate 60a connecting the pair of side plates 60b and 60c to each other, and has a U-shaped cross section formed by these plates. The pair of side plates 60b and 60c is disposed to come into contact with seat surfaces that motor housing 51 includes on both the left and right sides in the cross vehicle direction, and holds motor housing 51 from both the left and right sides in the cross vehicle direction.

In addition, the occupied width in the cross vehicle direction between the pair of side plates 60b and 60c according to the present embodiment is extended in the region on the upper-end side where motor housing 51 is held (motor holding portion S3 in FIG. 5) as compared to the occupied width on the lower-end side, and is greater at least than the occupied width of motor housing 51 in the cross vehicle direction. Note that LA and LB in FIG. 6 represent the occupied widths in the cross vehicle direction between the pair of side plates 60b and 60c located on the upper-end side and on the lower-end side, respectively.

The occupied width in the cross vehicle direction between the pair of side plates 60b and 60c is extended at the upper-end side as described above, so that support bracket 60 is of such a shape as not to interfere with motor housing 51 and hinder the movement of steering wheel 10 during tilt movement or the like of steering wheel 10. With this shape, interference of support bracket 60 with brake pedal B1 or with air conditioning duct B2 (illustrated only in FIG. 6 for convenience of explanation) in cab C is also prevented. Note that, cut-out portion S4 is provided in support bracket 60 at a position where there is a possibility of interference of support bracket 60 with air conditioning duct B2 or the like.

Motor fixing part 70 fixes support bracket 60 and motor housing 51 in a state where their relative position is adjustable.

More specifically, motor fixing part 70 includes fastening bolt 70a for fastening motor housing 51 and support bracket 60 (motor holding portion S3), adjustment nut 70b screwed onto fastening bolt 70a, and fastening lever 70c for rotating adjusting nut 70b (see FIGS. 7 and 8). Motor fixing part 70 enables adjustment of the relative position between support bracket 60 and motor housing 51 by changing the fastening position of fastening bolt 70a in long bolt holes 51h and 60h formed respectively in support bracket 60 and motor housing 51.

Note that, bolt hole 51h in FIG. 7 is a bolt hole for telescopic movement of steering wheel 10 (which means forward and backward movement in the axial direction of steering shaft 20; the same applies hereinafter), and is formed in motor housing 51 as if to draw a straight line. Bolt hole 51h is provided to penetrate motor housing 51, and fastening bolt 70a is inserted into bolt hole 51h.

Bolt hole 60h in FIG. 7 is a bolt hole for tilt movement of steering wheel 10 (representing movement of steering shaft 20 in the inclination direction in which steering shaft 20 inclines; the same applies hereinafter), and is formed in support bracket 60 as if to draw a curve. Bolt hole 60h is provided in both of the pair of side plates 60b and 60c of support bracket 60, and fastening bolt 70a is inserted into bolt hole 60h.

Motor fixing part 70 enables adjustment of the relative position between support bracket 60 and motor housing 51, for example, by the operation of the driver. For example, the driver releases the fastened state of motor housing 51 and support bracket 60 by rotating fastening lever 70c, and in such a state moves steering wheel 10, thereby moving fastening bolt 70a along bolt hole 51h (telescopic movement) or bolt hole 60h (tilt movement). After the driver moves fastening bolt 70a to a desired position, the driver puts fastening bolt 70a into the fastened state by rotating fastening lever 70c again. Thus, the driver can adjust the inclination angle and height of steering wheel 10 to desired positions.

Figure 9A:
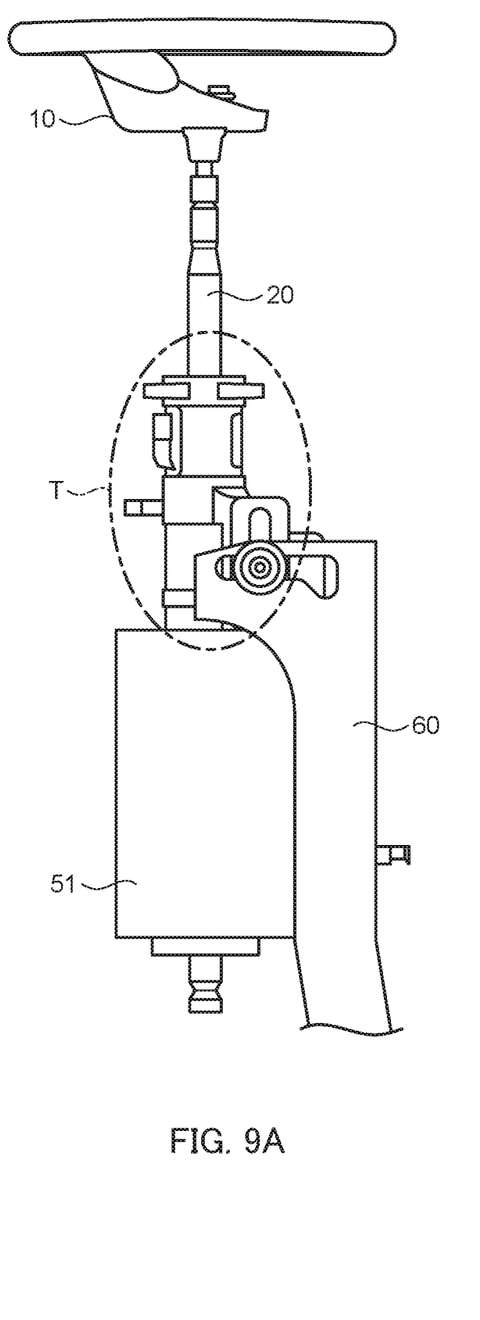
FIGS. 9A and 9B are explanatory views for explaining the effect of extension of the telescopic range of the steering shaft as brought about by the support structure for the coaxial motor according to one embodiment.
Figure 9B:
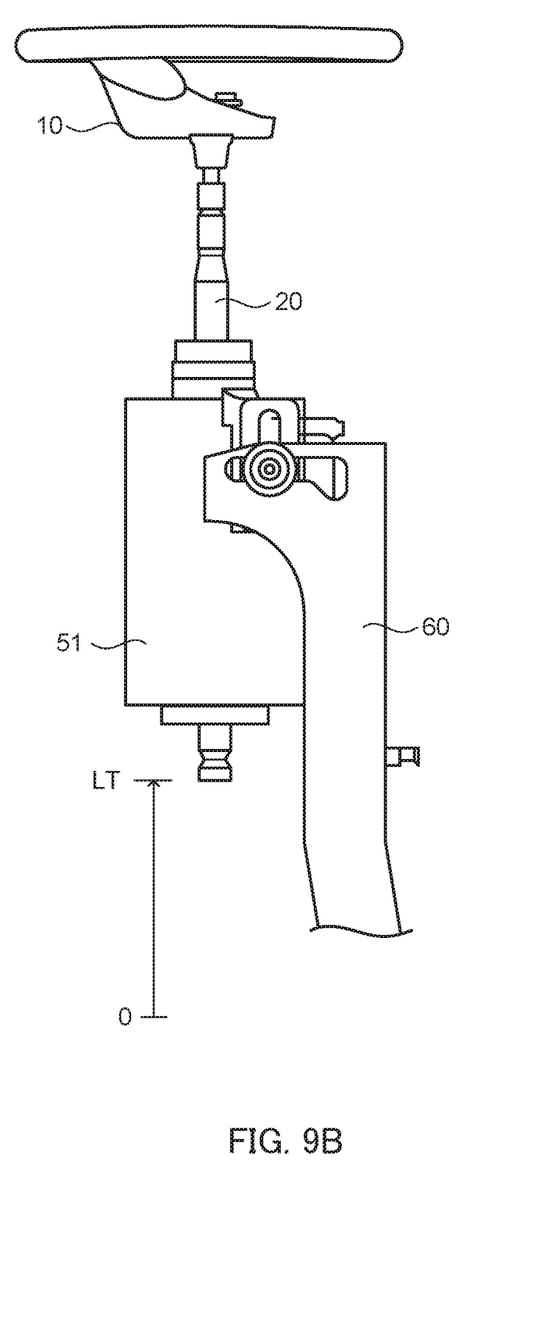

FIGS. 9A and 9B are explanatory views for explaining the effect of extension of the telescopic range of steering shaft 20 as brought about by the support structure for coaxial motor 50 according to the present embodiment.

FIG. 9A illustrates an aspect in which motor housing 51 is hypothetically added in a support structure according to the prior art, and FIG. 9B illustrates the support structure for coaxial motor 50 according to the present embodiment.

In general, the steering device is provided with dedicated shaft column member T directly below the steering wheel, thereby supporting the steering wheel and the like and making it possible to adjust the position of the steering wheel. Accordingly, if coaxial motor 50 is added in the support structure according to the prior art, the length by which the steering shaft is able to telescope is shorter by the length of motor housing 51 of added coaxial motor 50 as illustrated in FIG. 9A.

In contrast, in steering device 1 according to the present embodiment, motor housing 51 supports steering wheel 10 and the like, and the position of steering wheel 10 is adjustable at motor housing 51. That is, in steering device 1 according to the present embodiment, dedicated column member T is omitted (not installed), so that motor housing 51 is disposed as close as possible to the position of steering wheel 10 as illustrated in FIG. 9B. The telescopic range of steering shaft 20 (the fitting region at the connection position between the upper shaft and the lower shaft) can thus be extended by length LT of shaft column member T (the zero point in FIG. 9B indicates the lower end position of motor housing 51 in FIG. 9A).

As described above, according to steering device 1 according to the present embodiment, coaxial motor 50 that provides improved spaciousness is applied as the electric motor for assisting steering, and coaxial motor 50 (motor housing 51) is fixed directly below steering wheel 10 to support steering wheel 10, steering shaft 20, and the like. It is thus possible to mount coaxial motor 50 even in the cab-over vehicle without compression of the vehicle cabin space and in a state where the telescopic range of steering shaft 20 is sufficiently ensured.

In addition, according to steering device 1 according to the present embodiment, support bracket 60 is configured to support coaxial motor 50 itself, so that heavy coaxial motor 50 can be stably held. It is thus possible to ensure mechanical stability (for example, vibration resistance and strength).

In addition, steering device 1 according to the present embodiment has the support structure in which support bracket 60 holds motor housing 51 from both the left and right sides in the cross vehicle direction. It is thus possible to prevent support bracket 60 from interfering with motor housing 51 and hindering the movement of steering wheel 10 during tilt movement or the like of steering wheel 10.

(Modification 1)

Figure 10:
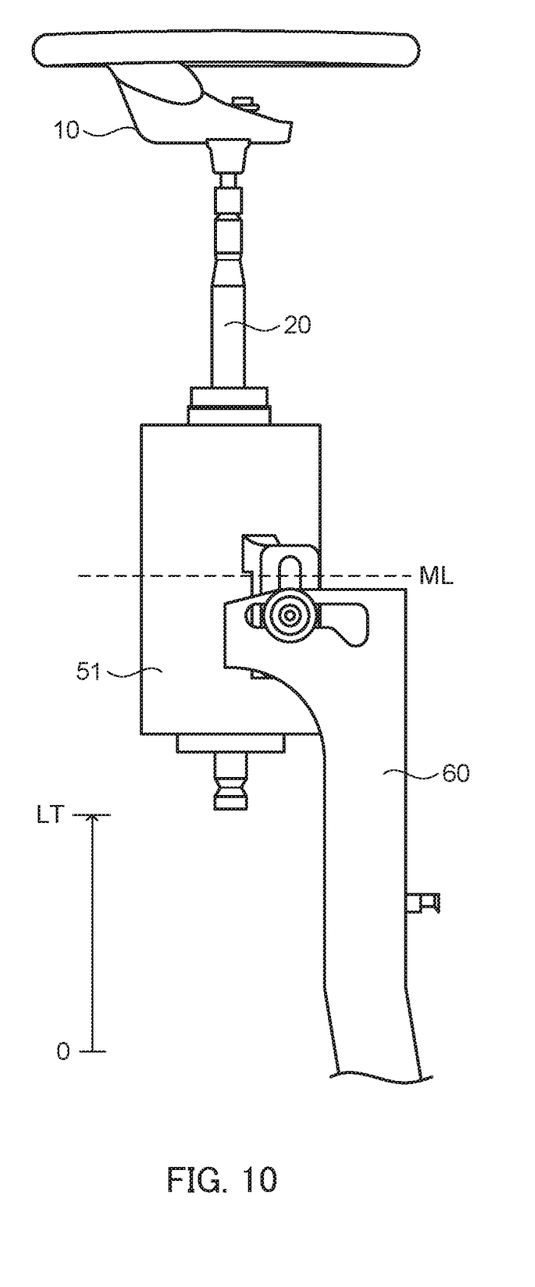
FIG. 10 illustrates a support structure for a motor housing according to Modification 1.

FIG. 10 illustrates the support structure for motor housing 51 according to Modification 1.

The present modification differs from the above-described embodiment in that motor fixing part 70 is configured to fix support bracket 60 and motor housing 51 at a lower side of motor housing 51 lower than the middle position (ML in FIG. 10) in the axial direction of motor housing 51.

According to the present modification, the telescopic range of steering shaft 20 can be extended without changing the position of support bracket 60 in cab C. The present modification is particularly useful when, for example, support bracket 60 interferes with other members (for example, brake pedal B1) in cab C.

(Modification 2)

Figure 11:
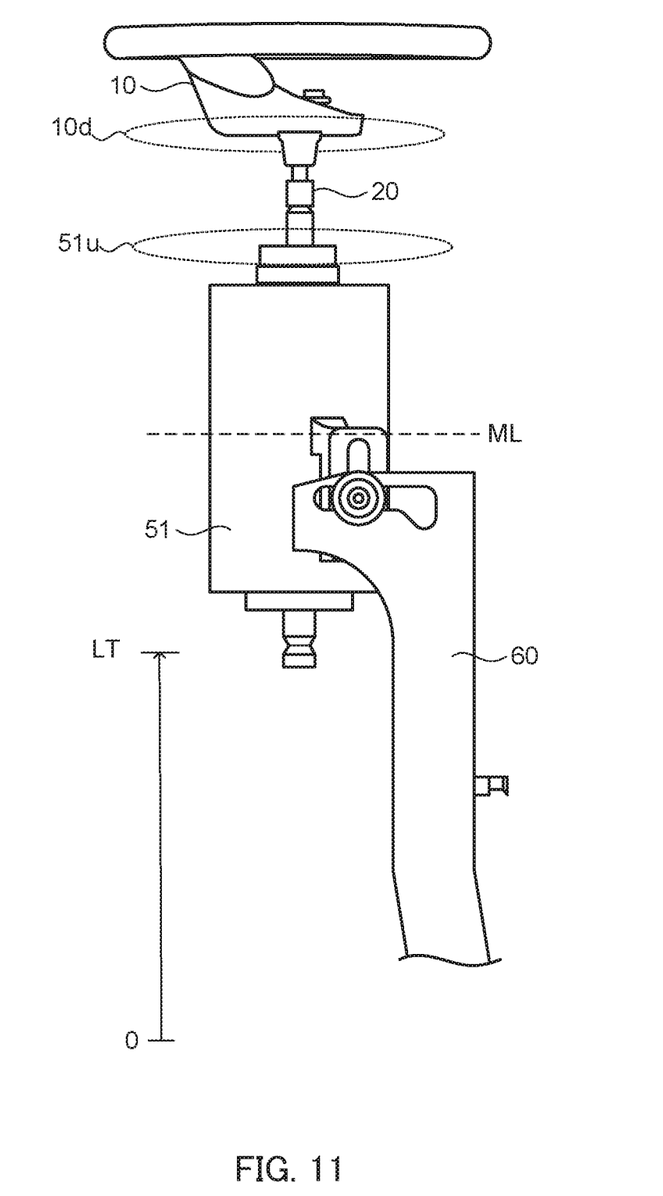
FIG. 11 illustrates a support structure for a motor housing according to Modification 2.

FIG. 11 illustrates a support structure for motor housing 51 according to Modification 2.

The support structure of the present modification is identical to the support structure for motor housing 51 according to Modification 1 except that the column switch (for example, switches such as a blinker and the like) and the key mechanism interposed between lower surface 10d of steering wheel 10 and upper surface 51u of motor housing 51 are, for example, changed in position or disused. That is, steering wheel 10 and motor housing 51 are disposed adjacent to each other such that lower surface 10d of steering wheel 10 and upper surface 51u of motor housing 51 directly face each other without any other component interposed in between.

It is thus possible to bring the position of disposed motor housing 51 closer to steering wheel 10, thereby further extending the telescopic range of steering shaft 20.

(Other Embodiments)

The present invention is not limited to the above-described embodiments, and various modified aspects may be derived therefrom.

With respect to the embodiment described above, the aspect has been described in which steering shaft 20 and bevel gear device 30 are used as one example of the power transmission path from steering wheel 10 to steering gearbox 40. However, the present disclosure may also be configured not to include bevel gear device 30.

Additionally or alternatively, although, with respect to the above-described embodiment, the configuration has been described as one example of steering shaft 20 in which a plurality of shaft members are connected to one another, steering shaft 20 may have any configuration as long as steering shaft 20 at least partially includes telescopically connected shaft portions. For example, any number of intermediate shafts may be provided. In addition, serration fitting or the like may also be used instead of spline fitting as the configuration of telescopic connection of steering shaft 20.

Additionally or alternatively, although the hydraulically-assisted rack and pinion mechanism has been described as one example of steering gearbox 40 in the above-described embodiment, steering gearbox 40 based on a ball nut mechanism may also be used. In place of the hydraulically-assisted rack and pinion mechanism, an electrically-assisted rack and pinion mechanism may also be used, or a rack and pinion mechanism having no steering assist mechanism may also be used.

Additionally or alternatively, although the aspect in which support bracket 60 is fixed, at its lower and upper ends, to cab C has been described as one example of support bracket 60 with respect to the above-described embodiment, an aspect in which support bracket 60 is fixed to cab C at one point may also be employed.

Additionally or alternatively, the aspect using fastening bolt 70a and the like that allows the fastening position to be changed has been described as one example of motor fixing part 70 with respect to the above-described embodiment. However, other aspects of connection may also be used for motor fixing part 70 as long as the relative position between support bracket 60 and motor housing 51 is adjustable. For example, a screwing method or the like allowing a fixation position to be changed by adjustment of a screwing depth of an adjusting screw may also be used.

Additionally or alternatively, although the cab-over vehicle has been described with respect to the above-described embodiment as one example of the vehicle to which steering device 1 is applied, steering device 1 according to the present invention is applicable to any other vehicle than the cab-over vehicle.

While concrete examples of the present invention have been described in detail above, those examples are mere examples and do not limit the scope of the appended claims. The techniques disclosed in the scope of the appended claims include various modifications and variations of the concrete examples exemplified above.

This application is based on Japanese Patent Application No. 2017-165757, filed on Aug. 30, 2017, the disclosure of which is incorporated herein by reference in its entirety.

INDUSTRIAL APPLICABILITY

According to the present disclosure, it is possible to realize a steering device that can solve a layout problem expected when an electric motor is disposed in a vehicle cabin.

REFERENCE SIGNS LIST

Steering device
10 Steering wheel
20 Steering shaft
30 Bevel gear device
40 Steering gearbox
50 Coaxial motor
51 Motor housing
52 Rotor
53 Stator
54 Torque sensor
60 Support bracket
70 Motor fixing part
C Cab
F Chassis frame

What is claimed is:

1. A steering device to be mounted on a vehicle, the steering device comprising:
   a steering wheel disposed in a vehicle cabin;
   a steering shaft including a first shaft portion directly connected at one end to the steering wheel, and a second shaft portion to be connected to an other-end side of the first shaft portion;
   a coaxial motor including a motor housing that surrounds a periphery of the first shaft portion to support the steering shaft, the coaxial motor causing rotational power to act on the first shaft portion; and a motor fixing part that fixes the motor housing and a support bracket fixed in the vehicle cabin, so as to determine a position at which the steering wheel is supported, wherein the vehicle is a cab-over vehicle having a tiltable vehicle cabin, wherein the second shaft portion has an upper shaft and a lower shaft that are fitted and connected to each other along the axial direction, and the second shaft portion is configured to be expandable in the axial direction by shortening a fitting region between the upper shaft and the lower shaft during cab tilting of the vehicle, wherein the motor fixing part fixes the motor housing and the support bracket at a lower side of the motor housing, the lower side being lower than a middle position in an upper-lower direction of the motor housing, and wherein the steering wheel and the motor housing are disposed adjacent to each other such that a lower surface of the steering wheel and an upper surface of the motor housing directly face each other without any interposition of a column switch or a key mechanism.

2. The steering device according to claim 1, wherein
the motor fixing part enables adjustment of a relative position between the motor housing and the support bracket.

3. The steering device according to claim 2, wherein
the motor fixing part includes a fastening bolt that connects the motor housing to the support bracket, and
the adjustment of the relative position between the motor housing and the support bracket is enabled by changing a fastening position of the fastening bolt in a long bolt hole formed in the support bracket or the motor housing.

4. The steering device according to claim 2, wherein
the motor fixing part enables the adjustment of the relative position between the motor housing and the support bracket in an axial direction or an inclination direction of the steering shaft.

5. The steering device according to claim 1, wherein
the support bracket is disposed to hold the motor housing from both left and right sides in a cross vehicle direction.

6. The steering device according to claim 1, wherein
the support bracket extends along an axial direction of the steering shaft in a front region in the vehicle cabin, the support bracket being fixed, at a lower-end side and at an upper-end side, to the vehicle cabin.

7. The steering device according to claim 1, wherein
a steering gearbox is provided outside the vehicle cabin,
the steering gearbox includes a hydraulic power assist mechanism, and
the steering gearbox allows a steered wheel to be steered according to a rotational motion of the steering shaft.

* * * * *